United States Patent [19]

Duxbury et al.

[11] Patent Number: 5,109,381
[45] Date of Patent: Apr. 28, 1992

[54] APPARATUS AND METHOD FOR DETECTING ERRORS IN A PIPELINE DATA PROCESSOR

[75] Inventors: Colin M. Duxbury, Woodley; Philip V. Rose, Higher Crumpsall, both of United Kingdom

[73] Assignee: International Computers Limited, London, England

[21] Appl. No.: 447,685

[22] Filed: Dec. 8, 1989

[30] Foreign Application Priority Data

Dec. 9, 1988 [GB] United Kingdom ............... 8828817

[51] Int. Cl.⁵ ..................... G06F 11/00; G06F 9/38
[52] U.S. Cl. .................... 371/16.5; 371/12; 395/575
[58] Field of Search .............. 371/16.1, 16.5, 12; 364/200

[56] References Cited

U.S. PATENT DOCUMENTS

| | | | |
|---|---|---|---|
| 4,500,958 | 2/1985 | Manton et al. | 364/200 |
| 4,500,959 | 2/1985 | Kubo et al. | 364/200 |
| 4,583,222 | 4/1986 | Fossum et al. | 371/16.1 |
| 4,757,445 | 7/1988 | Zolnowsky et al. | 371/16.1 X |
| 4,903,264 | 2/1990 | Talgam et al. | 371/16.1 |
| 4,982,402 | 1/1991 | Beaven et al. | 371/16.1 X |

Primary Examiner—Jerry Smith
Assistant Examiner—Allen M. Lo
Attorney, Agent, or Firm—Lee, Mann, Smith, McWilliams & Sweeney

[57] ABSTRACT

A pipelined data processing system comprises a series of pipeline stages through which instructions pass sequentially. If an error associated with a particular instruction (e.g. an illegal instruction) is detected, a Mayday signal is produced. This does not become active immediately. Instead it is passed down the pipeline along with the instruction that caused it, and becomes active only if that instruction attempts to terminate at the end of the pipeline. When the Mayday becomes active, it causes an interrupt to a diagnostic processor. If, on the other hand, the instruction that caused the Mayday is aborted, or does not attempt to terminate, then the Mayday is discarded and does not become active. This prevents unnecessary diagnostic actions.

9 Claims, 4 Drawing Sheets

APPARATUS AND METHOD FOR DETECTING ERRORS IN A PIPELINE DATA PROCESSOR

BACKGROUND TO THE INVENTION

This invention relates to data processing apparatus. More specifically, the invention is concerned with a pipelined data processor, in which each instruction passes through a sequence of processing stages which perform successive stages of execution of the instruction.

It is well known to provide checking facilities for monitoring the operation of a data processor, to detect failures such as hardware faults or software errors. For example, parity checking may be used to detect hardware faults. When a failure is detected, a signal sometimes referred to as a "Help" signal may be generated, requesting assistance from a diagnostic processor. When it receives the Help signal, the diagnostic processor stops the rest of the system and initiates diagnostic action to determine the cause of the failure.

The object of the present invention is to provide an improved error handling arrangement for a pipelined data processor.

SUMMARY OF THE INVENTION

According to the invention there is provided pipelined data processing apparatus comprising a series of pipeline stages for processing a sequence of instructions, characterised in that a) each instruction passes sequentially through the pipeline stages up to a termination stage at which the instruction is terminated if it has been successfully executed by the preceding stages, b) at least one of the stages other than the termination stage includes means for producing an error signal if it detects an error condition associated with the instruction currently being processed by this stage, and c) the error signal becomes active only when the associated instruction reaches the termination stage.

It can be seen that when an error associated with a particular instruction is detected, an active error signal is not produced immediately. Instead, the error signal becomes active only when the associated instruction attempts to terminate at the end of the pipeline. Thus, if for any reason the instruction does not attempt to terminate (e.g. because it follows a wrongly-predicted jump instruction) the error signal does not become active and so no error-handling actions are initiated. The invention therefore avoids unnecessary error-handling action, and hence improves the efficiency of the system.

In the following description, error signals handled in accordance with the present invention are referred to as "Mayday" signals to distinguish them from conventional "Help" signals which become active immediately.

BRIEF DESCRIPTION OF THE DRAWINGS

One processing apparatus in accordance with the invention will now be described by way of example with reference to the accompanying drawings.

DESCRIPTION OF AN EMBODIMENT OF THE INVENTION

Overall Description of System

Figure 1:
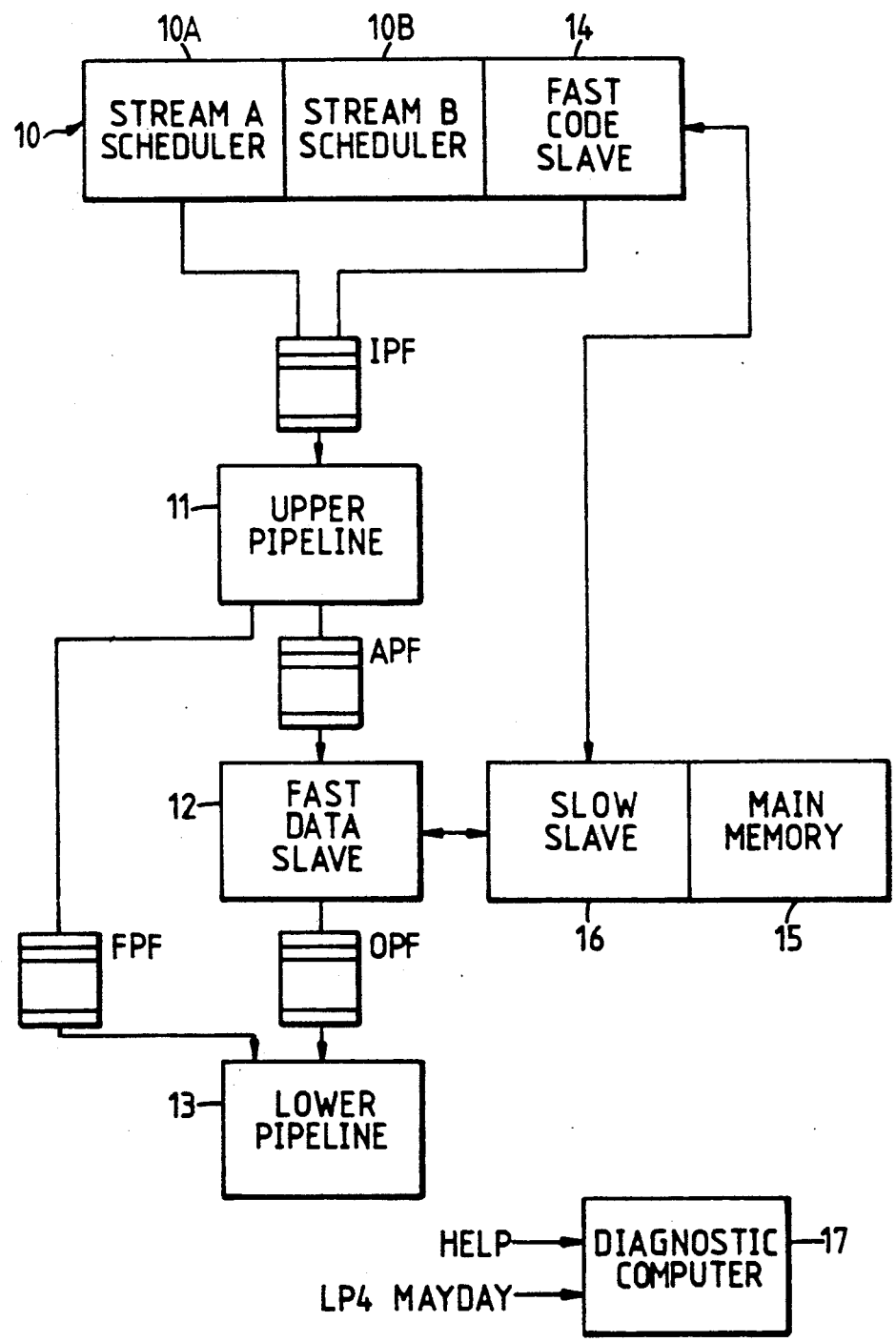
FIG. 1 is an overall diagram of the apparatus.

Referring to FIG. 1, the data processing apparatus comprises a series of pipeline units as follows: an instruction scheduler 10, an upper pipeline unit 11, a fast data slave store 12, and a lower pipeline unit 13.

The pipeline units 10-13 are interconnected by parameter files as follows:

An instruction parameter file IPF, an address parameter file APF, a function parameter file FPF, and an operand parameter file OPF. These allow instruction parameters to be passed between the pipeline units.

The scheduler 10 has a fast code slave 14 associated with it, for holding copies of instructions for access by the scheduler.

The system also includes a main store 15 of larger size but slower access speed than the slave stores, 12, 14, and a slow slave store 16 of size and speed intermediate between those of the main store and the fast slaves The fast slaves, the slow slave, and the main store form a three-level storage hierarchy.

The scheduler 10 comprises two scheduler units 10A and 10B, for scheduling two separate streams of instructions, referred to as stream A and stream B. Stream A is dedicated to the main processing workload of the system. Stream B handles events that are independent of this main processing workload, such as managing input/output activity, and communication with other processors. The provision of two independent streams allows more effective use of the hardware of the system. For example, when one stream is held up for some reason, the other stream can continue processing, so that the hardware is not idle.

Each of the scheduler units 10A, 10B generates a sequence of instruction addresses, for retrieving instructions from the code slave 14. If the required instruction is not in the code slave, it is retrieved from the slow slave 16 or from the main store 15.

When a conditional jump (branch) instruction is encountered, the scheduler makes a prediction of the probable outcome of the jump, and starts to fetch instructions from the predicted branch. The actual outcome of the jump instruction is not determined until the instruction reaches the lower pipeline, and so the prediction may be wrong. In this case, the instructions following the wrongly predicted jump must be aborted, and scheduling continued from the actual jump destination.

Instructions retrieved by the scheduler are written into IPF, along with their corresponding program counter values. The IPF has dual ports, so that the scheduler units 10A, 10B can load the IPF simultaneously.

Each of the parameter files IPF, APF, FPF and OPF comprises sixteen registers, and can therefore hold parameters for up to sixteen different instructions at various stages of execution. The set of registers relating to a particular instruction is referred to as a slot: that is, each slot comprises a corresponding register from each of the parameter files.

Ten of the slots are allocated to stream A and six to stream B.

When an instruction is initially entered into the IPF from the scheduler, it is assigned a slot i.e. it is assigned a register in IPF and a corresponding register in each of the other parameter files. The instruction then retains this slot until it has been successfully executed by all stages of each pipeline unit, whereupon the slot is released so that it is available for another instruction from the scheduler. As an instruction is passed down the pipeline, the slot number assigned to that instruction is passed down the pipeline with it, so that at each pipeline stage the appropriate register in the parameter file can be accessed.

The upper pipeline 11 reads instructions from the IPF and processes them, so as to decode them and to calculate the address of the required operand for the instruction. This may, for example, involve adding a displacement value to a base address held in an internal register, such as a local name base register.

Alternatively, the address may be a literal value held in the instruction. The operand address is placed in the APF in the slot appropriate to the instruction in question. The function code of the instruction is written into the appropriate slot of the FPF.

The data slave 12, when it is free, reads an address from the APF and retrieves the required operand, if it is present in the data slave, or alternatively initiates fetching of the operand from the slow slave or the main store. The retrieved operand is placed in the OPF in the slot appropriate to the instruction in question. Additionally, data from the slave may be returned to the upper pipeline so as to update one of the internal registers in that unit.

The lower pipeline 13 reads the operand from the OPF and performs the required operation on it as specified by the function code in FPF. For example, this may involve adding the operand to the contents of an accumulator register.

The system also includes a diagnostic processor 17. This is a relatively small processor, for example a microprocessor, which is dedicated to providing support and diagnostic facilities for the rest of the system.

Upper Pipeline

Figure 2:
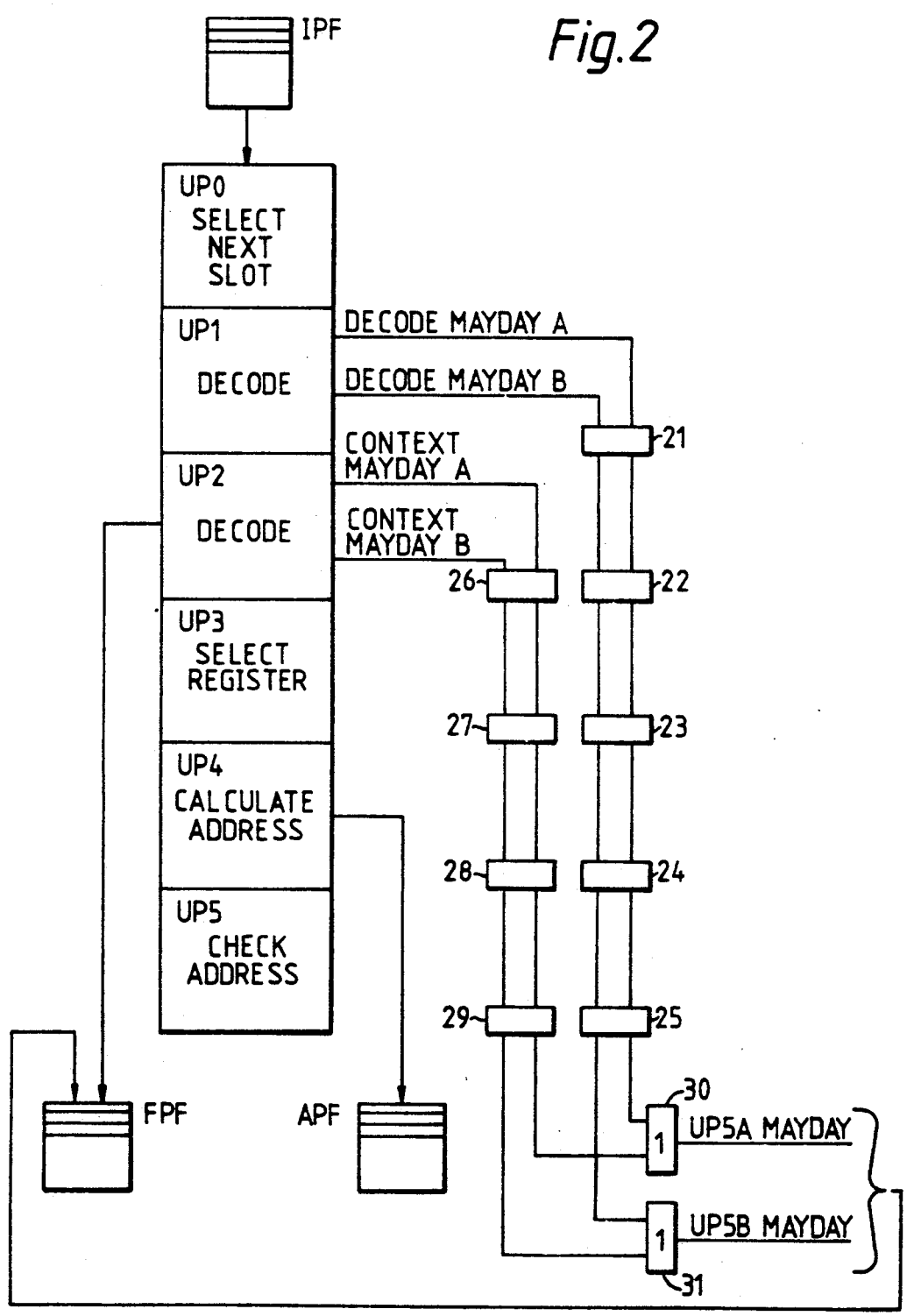
FIG. 2 shows an upper pipeline unit in more detail.

Referring now to FIG. 2, this shows the upper pipeline unit 11 in more detail.

The upper pipeline unit includes six pipeline stages referred to as UP0–UP5.

The first stage UP0 selects a slot from the IPF, so as to initiate processing of the instruction in that slot.

Normally, instructions in each stream are started in the upper pipeline in chronological order. Also, normally, stream A is given priority over stream B, so that a B-stream instruction is started only if there are no A-stream instructions available in IPF. However, stream B may be given priority, as follows.

After an instruction has been started, the upper pipeline may detect that the instruction cannot be successfully completed yet, because of a dependency on an earlier instruction. In this case, the instruction is abandoned. However instructions following abandoned instruction are allowed to continue running in a special mode called look-ahead mode, the purpose of which is to allow operands for the instructions to be prefetched, if necessary, into the fast data slave. Such look aheads are allowed only if they do not generate any further dependencies. The look-ahead mode can be initiated for stream A and B independently. When stream A is in look-ahead mode but not stream B, then stream B is given priority. When the dependency has been resolved, the stream is returned to normal non-look-ahead mode, and the abandoned instruction is restarted in the upper pipeline.

UP1 and UP2 are decoding stages, which decode the instruction to produce control signals for subsequent stages. UP2 also generates a function code F for the instruction, and this is written into the appropriate slot of FPF.

UP3 selects a required register to be used for address generation from a local set of registers.

UP4 contains an arithmetic and logic unit which calculates the required operand address for the instruction. The operand address is written into the appropriate slot of APF.

UP5 checks the address generated in UP4 for architectural validity. The results of this check are stored in FPF, where they can be accessed by the lower pipeline to influence termination success

Lower Pipeline

Figure 3:
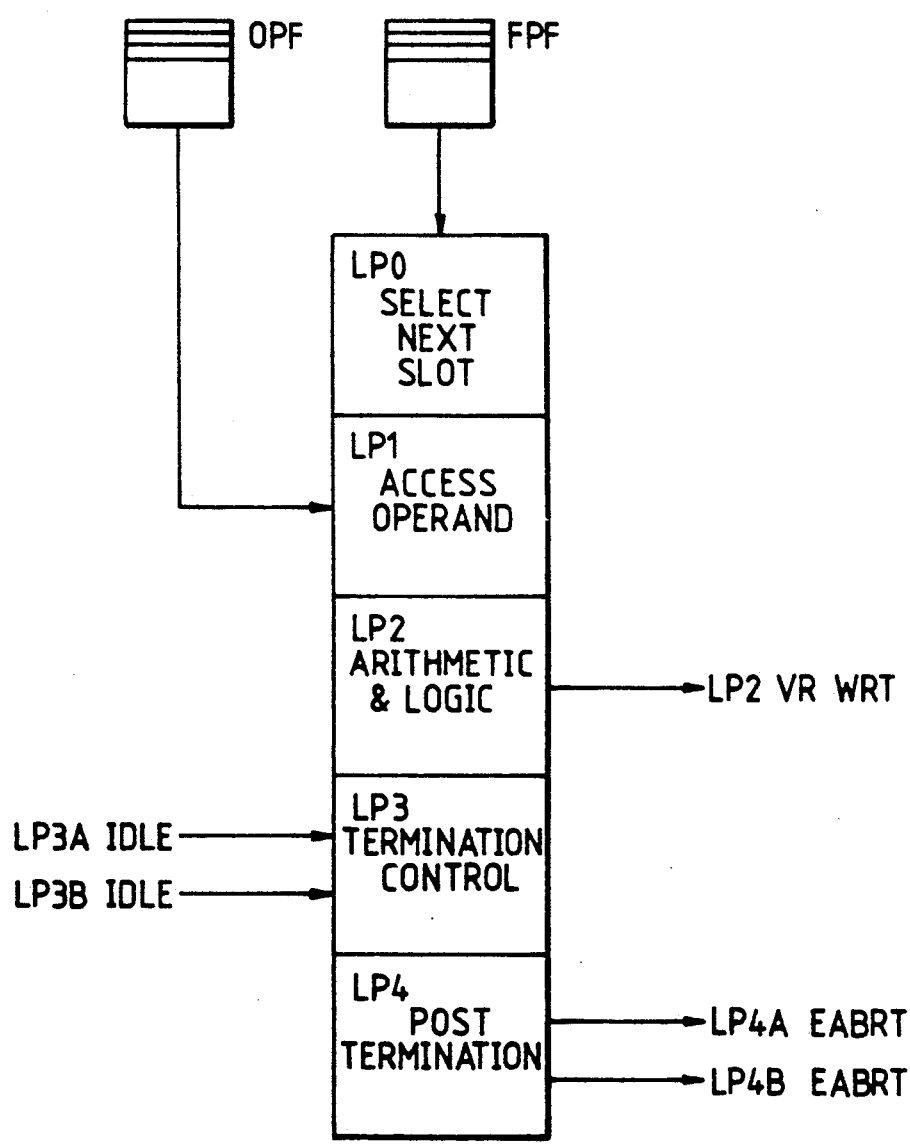
FIG. 3 shows a lower pipeline unit in more detail.

Referring now to FIG. 3, this shows the lower pipeline 13 in more detail. The lower pipeline comprises five stages LP0–LP4.

LP0 contains priority logic for selecting the next slot to be handled by the lower pipeline. This stage is triggered by a successful data slave cycle. Within each stream, instructions are started in the lower pipeline in strict chronological order.

LP1 accesses the required operand from OPF, and the function code F from FPF. The function code is decoded to produce control signals for the subsequent stages of the lower pipeline.

LP2 is the main processing stage, and performs arithmetic and logic operations on the operands as specified by the function code.

LP3 is the terminating stage of the pipeline. This stage receives signals from all the other pipeline units, indicating whether or not the instruction currently at stage LP3 was successfully processed by the pipeline units, without any exception conditions. If the instruction was successfully processed, the instruction is allowed to terminate. In the case of a conditional jump instruction, LP3 also determines whether the outcome of that instruction was correctly predicted by the scheduler.

LP3 also includes a set of registers which constitute the visible register set of the system (i.e. the registers that are visible to the machine code, such as an accumulator register, descriptor register, and stack-front register). These registers, along with the contents of the data slave and main memory, define the process state of the process currently being executed.

When an instruction terminates successfully, it is allowed to update the process state, by updating the visible register set and performing any required writes to the data slave or main memory. The slot occupied by the terminating instruction is then released so that it can be re-used.

If, on the other hand, an instruction does not terminate successfully at LP3, it is not allowed to alter the process state.

LP4 is beyond the end of the pipeline, and provides the timing for signals that occur after an instruction has terminated. In particular, if it is found in LP3 that the outcome of a conditional jump instruction has been wrongly predicted, or if an exception condition has occurred which prevents normal termination of an instruction in LP3, then at the next clock beat LP4 produces a signal LP4A EABRT or LP4B EABRT depending on whether the instruction is in stream A or B. This causes all subsequent instructions in the same stream already started in all pipelines to be aborted. It also causes all slots of the parameter files for the stream in question to be cleared.

Maydays

The system includes logic for detecting various failure conditions. These failures are divided into two types, as follows.

Failures that are directly attributable to faulty hardware (e.g. parity failures) produce an immediate HELP signal, which interrupts the diagnostic processor. The detection and handling of this type of failure forms no part of the present invention and so will not be described further.

Certain types of failures caused by errors in software and attributable to a specific machine-level instruction (e.g. an illegal instruction) are referred to herein as Maydays. Such a failure does not produce an immediate interrupt to the diagnostic processor. Instead, a Mayday indication is passed down the pipeline along with the instruction that caused it. The Mayday is activated only if the instruction attempts to terminate at stage LP3. When the Mayday is activated, the instruction is prevented from terminating. Then, at the next clock beat, a signal LP4 MAYDAY is produced, and this interrupts the diagnostic processor.

As mentioned above, if a wrongly-predicted jump is detected, or if an exception condition occurs preventing normal termination at LP3, all subsequent instructions in the same stream already in the pipeline are aborted. This includes clearing any pending Maydays for those subsequent instructions. Hence, the pending Maydays will not become active.

Referring again to FIG. 2, when an instruction is decoded in stage UP1, the decoder checks whether the instruction is illegal in form. If so, one of two signals DECODER MAYDAY A and DECODER MAYDAY B is produced, depending on whether the illegal instruction is in stream A or B. For example, one of these signals is produced if the instruction contains an illegal combination of function and operand.

Similarly, when an instruction is decoded in stage UP2, the decoder checks whether the instruction is illegal in its context. If so, one of two signal CONTEXT MAYDAY A and CONTEXT MAYDAY B is produced, according to which stream the instruction is in. For example, an END instruction is legal only in stream B, and so if an END instruction is found in stream A, the signal CONTEXT MAYDAY A is generated.

The DECODER MAYDAY signals are passed by way of a series of registers 21-25 from stage UP1 to UP5, in step with the instruction that produced the error signal. Similarly, the CONTEXT MAYDAY signals are passed by way of a series of registers 26-29 from stage UP2 to UP5.

In UP5, the DECODER MAYDAY A and CONTEXT MAYDAY A signals are combined in an OR gate 30, to produce a signal UP5A MAYDAY. A similar signal UP5B MAYDAY is produced for stream B by means of an OR gate 31. Both these signals are written into the slot of FPF associated with the instruction currently at UP5.

The OR gates 30, 31 also receive signals (not shown) from other stages of the upper pipeline, indicating other Mayday errors.

Figure 4:
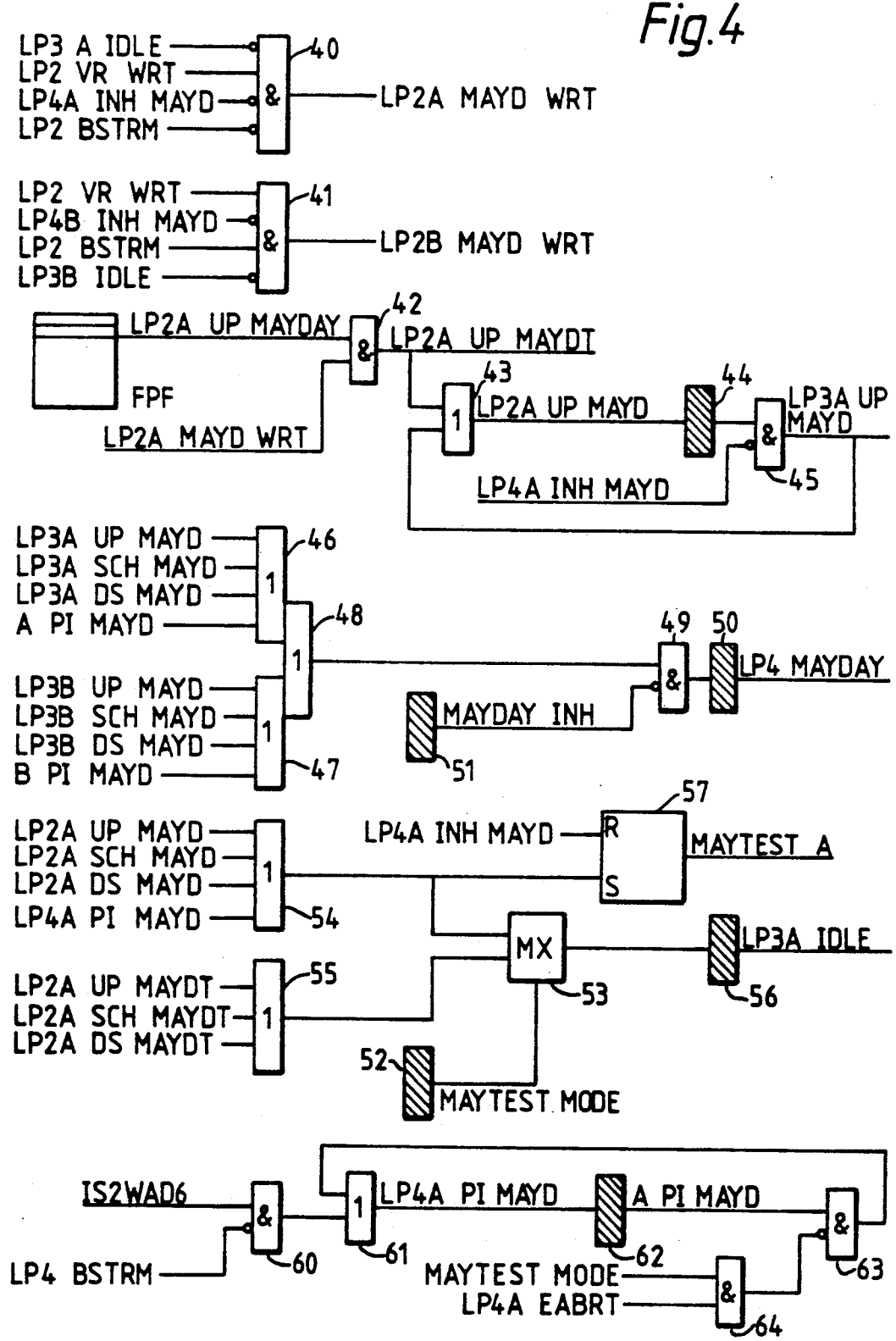
FIG. 4 shows logic for handling Mayday signals.

Referring now to FIG. 4, this shows the logic for handling Maydays.

An AND gate 40 combines a signal LP2 VR WRT with the inverses of signals LP4A INH MAYD, LP3A IDLE and LP2 BSTRM, producing an output signal LP2A MAYD WRT. LP2 VR WRT is asserted when the instruction currently at stage LP2 will in LP3 update the process state by writing to the visible registers. LP4A INH MAYD is derived from the signal LP4A EABRT which indicates that all instructions in stream A are to be aborted. LP3A IDLE is described later and indicates that the A-stream instruction in LP3 has already produced a Mayday. LP2 BSTRM indicates that the instruction currently at stage LP2 is in stream B.

Thus it can be seen that LP2A MAYD WRT indicates that the instruction at LP2 is about to update the process state, is in stream A, and is not to be idled by an elder Mayday or aborted. Thus, any pending Mayday for the instruction at LP2 can be activated.

A similar signal LP2B MAYD WRT is produced for stream B by an AND gate 41.

When an instruction reaches stage LP2, the FPF slot corresponding to that instruction is accessed, to read out the Mayday signals that were stored there at stage UP5 of the upper pipeline. This produces signals LP2A UP MAYDAY and LP2B UP MAYDAY for the A and B streams.

LP2A UP MAYDAY is combined with LP2A MAYD WRT in an AND gate 42, to produce a signal LP2A UP MAYDT. This signal is fed to one input of an OR gate 43, the output of which is a signal LP2A UP MAYD. This is connected to the input of a single-bit register 44. The output of register 44 is fed to one input of an AND gate 45, the other input of which receives the inverse of the signal LP4A INH MAYD. The output of AND gate 45 is a signal LP3A UP MAYD which is fed back to the second input of the OR gate 43.

Thus it can be seen that, when LP2A UP MAYDT is asserted, LP2A UP MAYD goes true, and LP3A UP MAYD goes true one clock beat later. Both the signals LP2A UP MAYD and LP3A UP MAYD are latched in this state, by virtue of the feedback connection through the OR gate 43, and hence both remain true even when LP2A UP MAYDT goes false again. These latched signals go false again only when LP4A INH MAYD is asserted, disabling the AND gate 45.

Similar circuits (not shown) are provided for receiving Mayday signals from the scheduler and data slave. These produce unlatched signals LP2A SCH MAYDT and LP2A DS MAYDT, and corresponding latched signals.

Similar circuits (not shown) are also provided for forming corresponding signals LP2B UP MAYDT and so on for stream B.

The latched signals for stream A (LP3A UP MAYD, LP3A SCH MAYD and LP3A DS MAYD) are combined in an OR gate 46, while the corresponding latched signals for stream B are combined in an OR gate 47. The outputs of these two OR gates are combined in an OR gate 48. The output of this gate is fed by way of an AND gate 49 to a single-bit register 50. The output of this register provides the signal LP4MAYDAY, which informs the diagnostic processor of the existence of an active Mayday condition.

The second input of AND gate 49 receives the inverse of a signal MAYDAYINH from a control bit register 51, which can b set or cleared by the diagnostic processor. It can be seen that when MAYDAYINH is true, the LP4MAYDAY signal is suppressed.

The diagnostic processor can also set or clear a further control bit register 52, which produces a control signal MAY TEST MODE. When this signal is true, a special Mayday test mode is activated, which allows the operation of the Mayday facilities to be tested, as will be described.

MAY TEST MODE controls a multiplexer 53. In normal operation (MAY TEST MODE false) the multiplexer 53 selects the output of an OR gate 54, which receives the latched signals LP2A UP MAYD etc. In the Mayday test mode (MAY TEST MODE true)the multiplexer 53 selects the output of an OR gate 55 which receives the unlatched signals LP2A UP MAYDT etc. The output of the multiplexer 53 is written into a single-bit register 56, the output of which provides a signal LP3A IDLE.

The signal LP3A IDLE is fed to stage LP3 of the lower pipeline and, when true, causes that stage to become idle for stream A. Thus, any stream A instructions reaching that stage are prevented from terminating, and the slots allocated to those instructions are not released. However, LP3A IDLE does not prevent stream B instructions from terminating.

Similar logic (not shown) is provided for forming a signal LP3B IDLE which causes LP3 to become idle for stream B.

The output of the OR gate 54 is fed to the SET input of a bistable latch circuit 57, which is reset by LP4A INH MAYD. The output of this latch MAYTEST A can be inspected by the diagnostic processor. A similar latch (not shown) is provided for stream B.

In addition to the sources of Mayday condition described above, a Mayday may also be produced by software, by causing an instruction to set a control signal IS2WAD6. This control signal is combined in an AND gate 60 with the inverse of a signal LP4 BSTRM which indicates that LP4 is currently handling stream B. The output of the AND gate 60 is fed to one input of an OR gate 61, the output of which is a signal LP4A PI MAYD. This signal is stored in a single-bit register 62, the output of which is a signal A PI MAYD. This signal is fed back, by way of an AND gate 63, to the second input of the OR gate 61. The AND gate 63 is controlled by the inverse of a signal from AND gate 64, which combines the MAY TEST MODE signal and the signal LP4A EABRT, which aborts the instructions in stream A.

The signal LP4A PI MAYD is fed to the OR gate 54 along with the other Mayday signals described above, and produces the LP3A IDLE signal in the normal mode.

The signal A PI MAYD is fed to the OR gate 46 along with the other Mayday signals, and produces the LP4MAYDAY signal, unless MAYDAY INH is true.

Both the signals LP4A PI MAYD and A PI MAYD are latched by virtue of the feedback connection to the OR gate 61. Hence, when these signals become true, they remain true until the AND gate 63 is inhibited by the signal from the AND gate 64.

Similar circuits (not shown) are also provided for software-controlled Maydays in stream B. These produce signals LP4B PI MAYD and B PI MAYD.

Operation

The operation of the Mayday facilities will now be described.

Whenever an error is detected attributable to a specific instruction, a Mayday signal is generated. For example, if an illegal combination of function and operand is detected a DECODER MAYDAY signal is produced in stage UP1. This Mayday signal is then passed down the pipeline in step with the instruction that caused it. For example, the DECODER MAYDAY signal passes down the upper pipeline to stage UP5 where it is stored in FPF, and then read out of FPF when the instruction reaches stage LP2 in the lower pipeline.

If the instruction is aborted before it reaches LP2, then the pending Mayday is discarded and does not become active. Similarly, if an instruction does not attempt to update the process state, at stage LP3, any Mayday associated with it is discarded and has no effect.

Assuming however, that the instruction is not aborted, and attempts to terminate at stage LP3, then the Mayday is handled as follows.

In normal operation (MAYTEST MODE false), an idle signal (LP3A IDLE or LP3B IDLE) is produced when the instruction reaches LP3. This prevents the instruction that caused the Mayday from terminating.

At the next clock beat after the instruction reaches LP3, the signal LP4 MAYDAY is produced. This interrupts the diagnostic processor. Meanwhile, the Idle signal is maintained so as to prevent subsequent instructions from terminating at LP3.

When the diagnostic processor responds to the interrupt, it stops the clocks in the rest of the system, and initiates diagnostic tests to determine the cause of the Mayday. This may involve inspecting the contents of registers on the various pipeline stages in which the information about the cause of the Mayday is preserved.

Finally, after the diagnostic procedure has been completed, the diagnostic processor will reset and reload the system.

The operation in the Mayday test mode (MAYTEST MODE true) is similar, except that in this case the Idle signal is maintained only for a single clock beat, since in this case the Idle is produced from the unlatched signals at OR gate 55. Hence, instructions subsequent to the one that caused the Mayday are allowed to terminate normally.

The Mayday test mode may be used to test the operation of the Mayday facilities as follows. A deliberately incorrect instruction is inserted into the program, and the system is then run in the Mayday test mode with registers MAYTEST MODE and MAYDAY INH set. Assuming that the Mayday facilities are operating correctly, this instruction will be prevented from terminating at LP3. However, the signal LP4 MAYDAY is not produced and subsequent instructions are allowed to terminate normally. Hence, a subsequent instruction can check that the Mayday facilities are working properly, by checking that the Mayday caused latch MAYTEST A to set. The Mayday test mode thus allows test software to check the Mayday mechanism, without affecting the normal running of the test program.

We claim:

1. Pipelined data processing apparatus comprising:
   a) a plurality of processing stages connected in series to form an instruction pipeline for executing a sequence of instructions,
   b) a termination stage connected to said processing stages, for terminating execution of an instruction after it has been successfully executed by all said processing stages, c) error detection means connected to one of the processing stages, for producing an error signal upon detection of an error condition associated with a particular instruction currently being processed by that processing stage, d) means for passing said error signal to the termination stage in step with said particular instruction, e) activation means for activating said error signal only when said particular instruction reaches said termination stage, and f) means for aborting an instruction before it reaches the termination stage, and for discarding any error signal associated with that instruction.

2. Apparatus according to claim 1 wherein said means for passing said error signal to the termination stage comprises:

a) a memory having a plurality of locations, b) means for allocating said locations to respective ones of said instructions, c) means for writing said error signals into a location of said memory allocated to said particular instruction, and d) means for reading said error signal from the memory when said particular instruction reaches the termination stage.

3. Apparatus according to claim 1, further including:

a) a diagnostic processor, connected to said processing stages, and b) means responsive to activation of said error signal, for causing said diagnostic processor to initiate a diagnostic procedure to diagnose said error condition.

4. Apparatus according to claim 1 further including means for preventing normal termination of said particular instruction when said error signal is activated.

5. Apparatus according to claim 4 further including:

a) means for defining a normal mode of operation and a test mode of operation, b) means responsive to said normal mode of operation for preventing normal termination of instructions subsequent to said particular instruction, and c) means responsive to said test mode of operation for permitting normal termination of instructions subsequent to said particular instruction.

6. A data processing method comprising the steps:

a) passing a sequence of instructions through a series of processing stages up to a termination stage, b) producing an error signal upon detection in one of said processing stages of an error condition associated with a particular instruction currently being processed by that stage, c) passing said error signal to the termination stage in step with particular instructions, and d) activating said error signal when said particular instruction reaches said termination stage.

7. A method according to claim 6 wherein the step of passing he error signal to the termination stage comprises:

a) writing the error signal into a memory location associated with said particular instruction, and b) reading the error signal from the memory location when said particular instruction reaches the termination stage.

8. A method according to claim 6 including the further step of initiating a diagnostic procedure to diagnose said error condition when said error signal is activated.

9. A method according to claim 6 including the further steps:

a) selecting between a normal mode of operation and a test mode of operation, b) in the normal mode of operation, preventing normal termination of said particular instruction and subsequent instructions, c) in the test mode of operation, preventing normal termination of said particular instruction but permitting normal termination of subsequent instructions.

* * * * *